United States Patent
Thybo et al.

(10) Patent No.: US 10,151,517 B2
(45) Date of Patent: *Dec. 11, 2018

(54) EXPANSION VALVE WITH A DISTRIBUTOR

(75) Inventors: Claus Thybo, Soenderborg (DK); Leo Bram, Augustenborg (DK); Jens Pawlik, Broager (DK)

(73) Assignee: Danfoss A/S, Nordborg (DK)

( * ) Notice: Subject to any disclaimer, the term of this patent is extended or adjusted under 35 U.S.C. 154(b) by 1751 days.

This patent is subject to a terminal disclaimer.

(21) Appl. No.: 12/664,717

(22) PCT Filed: Jun. 17, 2008

(86) PCT No.: PCT/DK2008/000219
§ 371 (c)(1),
(2), (4) Date: Jun. 22, 2010

(87) PCT Pub. No.: WO2008/154919
PCT Pub. Date: Dec. 24, 2008

(65) Prior Publication Data
US 2010/0293978 A1 Nov. 25, 2010

(30) Foreign Application Priority Data

Jun. 19, 2007 (DE) .......................... 10 2007 028 563
Mar. 19, 2008 (DK) ................................ 2008 00425

(51) Int. Cl.
*F25B 41/04* (2006.01)
*F25B 1/00* (2006.01)
(Continued)

(52) U.S. Cl.
CPC ............ *F25B 41/062* (2013.01); *F16K 11/04* (2013.01); *F16K 11/074* (2013.01); *F25B 39/028* (2013.01);
(Continued)

(58) Field of Classification Search
CPC .......... F25B 41/04; F25B 41/062; F25B 5/02; F25B 2600/2513; F25B 2600/2511; F25B 2341/0661; F16K 11/074
(Continued)

(56) References Cited

U.S. PATENT DOCUMENTS 1,589,243 A * 6/1926 Lane .................... F02M 61/047
137/903
1,985,617 A * 12/1934 Morton ................. F25B 39/028
138/42
(Continued)

FOREIGN PATENT DOCUMENTS

| JP | 6068575 A | 3/1994 |
|---|---|---|
| JP | 8-068575 A | 3/1996 |

(Continued)

OTHER PUBLICATIONS

Co-pending U.S. Appl. No. 12/663,577 entitled "A Modular Valve" filed Dec. 8, 2009.

*Primary Examiner* — Kun Kai Ma
(74) *Attorney, Agent, or Firm* — McCormick, Paulding & Huber LLP

(57) ABSTRACT

An expansion valve (1) comprising an inlet opening (2) and a distributor (4) being arranged to distribute fluid medium received from the inlet opening to at least two parallel flow paths (3). At least two outlet openings (3) are adapted to deliver fluid in an at least partially gaseous state, and each outlet opening is fluidly connected to one of the parallel flow paths. A first valve part (7) and a second valve part (5) are arranged movably relative to each other in such a manner that the mutual position of the first valve part and the second valve part determines the opening degree of the expansion valve. Since the distributor (4) forms part of the expansion valve, it distributes the fluid medium to the parallel flow paths prior to or during expansion of the fluid medium, i.e.

(Continued)

while the fluid medium is in a substantially liquid state. This makes it easier to control the distribution of fluid medium to the parallel flow paths in a uniform manner.

20 Claims, 11 Drawing Sheets

(51) Int. Cl.
*F25B 41/06* (2006.01)
*F16K 11/04* (2006.01)
*F16K 11/074* (2006.01)
*F25B 39/02* (2006.01)

(52) U.S. Cl.
CPC ............... *F25B 2341/0661* (2013.01); *F25B 2600/2511* (2013.01)

(58) Field of Classification Search
USPC ..... 62/197, 198, 222; 236/92 B, 93 A, 99 R; 137/625.31, 625.46; 251/206
See application file for complete search history.

(56) References Cited

U.S. PATENT DOCUMENTS

| | | | |
|---|---|---|---|
| 2,144,898 A | | 1/1939 | Shrode |
| 2,432,859 A | * | 12/1947 | Carter ................. F25B 39/028 137/110 |
| 2,832,666 A | | 4/1958 | Hertzberg et al. |
| 3,152,453 A | | 10/1964 | Hamilton |
| 3,363,540 A | * | 1/1968 | Mason ................... A62B 13/00 137/461 |
| 3,433,265 A | * | 3/1969 | Bartholet ................ F16K 3/085 137/625.18 |
| 3,967,782 A | | 7/1976 | Eschbaugh et al. |
| 4,305,261 A | * | 12/1981 | Becker .................... F16K 3/08 62/381 |
| 4,360,040 A | * | 11/1982 | Cove ........................ F16K 3/34 137/625.3 |
| 4,431,028 A | * | 2/1984 | Hendrick .................. F16K 3/08 137/625.3 |
| 4,488,475 A | * | 12/1984 | Masuda ................. B62D 5/083 137/625.21 |
| 4,574,840 A | | 3/1986 | Schumann et al. |
| 4,982,572 A | * | 1/1991 | Moore .................... F25B 41/04 62/122 |
| 5,417,083 A | * | 5/1995 | Eber ....................... F16K 3/085 251/129.11 |
| 5,517,800 A | | 5/1996 | Brenner |
| 5,819,798 A | | 10/1998 | Claflin et al. |
| 5,832,744 A | | 11/1998 | Dorste et al. |
| 6,012,487 A | * | 1/2000 | Hauck ................. F16K 11/0743 137/625.11 |
| 6,076,365 A | * | 6/2000 | Benatav ............... F16K 11/0743 137/625.43 |
| 8,434,512 B2 | * | 5/2013 | Bergmann ............ F16K 11/074 137/625 |
| 8,720,423 B2 | * | 5/2014 | Perr ....................... F16K 3/085 123/190.1 |
| 9,109,824 B2 | * | 8/2015 | Pawlik .................. F16K 11/074 |
| 9,316,324 B2 | * | 4/2016 | Berndt ................. F16K 11/074 |
| 9,625,044 B2 | * | 4/2017 | Bjernulf ............. G01N 35/1097 |
| 2003/0098076 A1 | * | 5/2003 | Nichols ................ F16K 11/074 137/625.46 |
| 2005/0092002 A1 | * | 5/2005 | Wightman ............ F16K 3/0209 62/222 |
| 2005/0126643 A1 | * | 6/2005 | Romero .................... F16K 3/08 137/606 |
| 2007/0246678 A1 | * | 10/2007 | Michaels .............. F16K 11/087 251/304 |
| 2008/0019844 A1 | * | 1/2008 | Park ..................... F04B 27/1018 417/269 |

FOREIGN PATENT DOCUMENTS

| | | | |
|---|---|---|---|
| JP | 08068575 A | * | 3/1996 |
| JP | 2000055510 A | * | 2/2000 |
| JP | 2003004340 A | | 1/2003 |
| JP | 2005003190 A | | 1/2005 |
| WO | 2006/097892 A2 | | 9/2006 |
| WO | 2006/116999 A1 | | 11/2006 |

* cited by examiner

EXPANSION VALVE WITH A DISTRIBUTOR

CROSS REFERENCE TO RELATED APPLICATIONS

This application is entitled to the benefit of and incorporates by reference essential subject matter disclosed in International Patent Application No. PCT/DK2008/000219 filed on Jun. 17, 2008 and German Patent Application No. 10 2007 028 563.0 filed Jun. 19, 2007 and Danish Patent Application No. PA 2008 00425 filed Mar. 19, 2008.

FIELD OF THE INVENTION

The present invention relates to an expansion valve, in particular for use in a refrigeration system. More particularly, the present invention relates to an expansion valve having a distributor arranged to distribute fluid medium received from an inlet opening to at least two parallel flow paths.

BACKGROUND OF THE INVENTION

In a fluid circuit, such as a refrigerant circuit of a refrigeration system, it is sometimes desirable to split the flow path into two or more parallel flow paths along part of the fluid circuit. This is, e.g., the case in refrigeration systems comprising two or more evaporators arranged in parallel. It may further be desirable to be able to control the fluid flow to each of the parallel flow paths, e.g. in such a manner that a substantially equal fluid distribution is obtained, or in such a manner that the system is operated in an optimum manner, e.g. in terms of energy consumption or efficiency.

In some previous attempts to control distribution of refrigerant between two or more parallel flow paths in a refrigeration system, a distributor is arranged downstream relative to an expansion valve in the refrigerant flow path. Thus, the refrigerant is distributed after expansion of the refrigerant, i.e. the refrigerant is mainly gaseous. This has the disadvantage that it is very difficult to control the flow of refrigerant to obtain a substantially equal distribution between the parallel flow paths.

SUMMARY OF THE INVENTION

It is an object of the invention to provide an expansion valve which is capable of controlling distribution of fluid to two or more parallel flow paths.

It is a further object of the invention to provide an expansion valve with a distributor being suitable for use with microchannels.

It is an even further object of the invention to provide an expansion valve with a distributor which is easier to control than similar prior art distributors.

It is an even further object of the invention to provide a refrigeration system comprising at least two evaporators fluidly coupled in parallel in the refrigerant flow paths, in which distribution of refrigerant to the evaporators can be controlled easier than in similar prior art refrigeration systems.

According to a first aspect of the invention the above and other objects are fulfilled by providing an expansion valve comprising:
an inlet opening adapted to receive fluid medium in a liquid state,
a distributor comprising an inlet part fluidly connected to the inlet opening, the distributor being arranged to distribute fluid medium received from the inlet opening to at least two parallel flow paths,
at least two outlet openings, each being adapted to deliver fluid medium in an at least partly gaseous state, each of the outlet openings being fluidly connected to one of the parallel flow paths, and
a first valve part and a second valve part arranged movably relative to each other in such a manner that the mutual position of the first valve part and the second valve part determines an opening degree of the expansion valve.

The expansion valve of the invention defines flow paths between the inlet opening and the at least two outlet openings. Fluid medium in a liquid state is received at the inlet opening and fluid medium in an at least partly gaseous state is delivered at the outlet openings. In the present context the term 'liquid state' should be interpreted to mean that the fluid medium entering the expansion valve via the inlet opening is substantially in a liquid phase. Similarly, in the present context the term 'substantially gaseous state' should be interpreted to mean that the fluid medium leaving the expansion valve via the outlet openings is completely in a gaseous phase, or at least a substantial part of the volume of the fluid medium leaving the expansion valve is in a gaseous phase. Accordingly, at least a major part of the fluid medium entering the expansion valve undergoes a phase transition from the liquid phase to the gaseous phase when passing through the expansion valve.

The inlet opening and the outlet openings may preferably be fluidly connected to one or more other components, such as other components of a refrigeration system. The expansion valve may advantageously form part of a flow system, such as a flow circuit.

The expansion valve comprises a distributor arranged to distribute fluid medium received from the inlet opening to at least two parallel flow paths. The flow paths are parallel in the sense that fluid can flow along the flow paths in a parallel manner, i.e. they are arranged fluidly in parallel. Each of the flow paths is fluidly connected to one of the outlet openings, i.e. fluid medium entering a given flow path leaves the expansion valve via a given, corresponding outlet opening. Accordingly, the distributor ensures that the fluid medium received at the inlet opening is distributed among the outlet openings in a predetermined and desired manner.

Some prior art apparatuses used for controlling distribution of refrigerant between two or more parallel flow paths in a refrigeration system are adapted to distribute refrigerant to only one of the parallel flow paths at a time. In the case that the parallel flow paths are in the form of microchannels, it would be necessary, in order to use this approach, to switch the distributor very rapidly between the flow paths in order to avoid that all of the refrigerant 'boils off' at one of the flow paths. This is very difficult, or even impossible, to perform, and the method can therefore not be used for microchannels.

It is an advantage that the distributor of the invention forms part of the expansion valve, because the distribution of the fluid medium between the parallel flow paths thereby takes place either before or during expansion of the fluid medium. Thereby it is obtained that the fluid medium is distributed while at least a substantial part of it is in the liquid phase. This makes it easier to control the distribution. Furthermore, it makes the expansion valve suitable for use in flow systems of the microchannel type.

The expansion valve further comprises a first valve part and a second valve part. The valve parts are arranged movably relative to each other. This may be achieved by mounting the first and/or the second valve part in a manner which allows it/them to move relative to the remaining parts of the expansion valve. Thus, the first valve part may be movable while the second valve part is mounted in a fixed manner. As an alternative, the second valve part may be movable while the first valve part is mounted in a fixed manner. Finally, both of the valve parts may be movably mounted. In all of the situations described above a relative movement between the first valve part and the second valve part is possible, thereby defining a mutual position of the first valve part and the second valve part. This mutual position determines an opening degree of the expansion valve. Thus, the opening degree of the expansion valve, and thereby the amount of fluid medium allowed to pass the expansion valve, can be adjusted by adjusting the mutual position of the first valve part and the second valve part.

The distributor may preferably be arranged in such a manner that at least substantially liquid fluid medium is distributed to each of the at least two parallel flow paths. As mentioned above, this makes it much easier to control the distribution of fluid medium to the parallel flow paths.

The first valve part and/or the second valve part may form part of the distributor. According to this embodiment the distribution of fluid medium takes place during expansion of the fluid medium.

Alternatively, the distributor may be fluidly connected between the inlet opening and the first and second valve parts. According to this embodiment, the distribution of fluid medium takes place prior to expansion of the fluid medium, i.e. the fluid medium being distributed is in a liquid phase.

The fluid medium may advantageously be a refrigerant. In this case the expansion valve is preferably arranged in a refrigerant circuit of a refrigeration system.

A correspondence between opening degree of the expansion valve and mutual position of the first valve part and the second valve part may be defined by a geometry of the first valve part and/or a geometry of the second valve part. Such a geometry may be or comprise size and/or shapes of openings defined in the first and/or second valve part, size and/or shape of valve elements/valve seats formed on the first and/or second valve parts, and/or any other suitable geometry. This will be described further below.

The first valve part and/or the second valve part may be movable to obtain a mutual position of the first valve part and the second valve part in which fluid flow to at least one of the at least two parallel flow paths is prevented. According to this embodiment one or more of the flow paths may be blocked while one or more of the remaining flow paths receives fluid medium. This may be desirable in the case that the expansion valve forms part of a refrigeration circuit of an air condition system and each of the outlet openings is fluidly connected to a separate evaporator, the evaporators being arranged in the same refrigerated volume. In this case an increased dehumidification of the refrigerated volume can be obtained without increasing the refrigeration capacity of the air condition system. This is obtained in the following manner. When the refrigerant supply to one of the evaporators is closed off, the suction pressure of the vapour compression system decreases until a new equilibrium point is found. This causes the total mass flow of refrigerant in the closed loop system, and thereby the amount of available refrigerant, to decrease. However, the decrease in total mass flow does not completely amount to the amount of refrigerant which was previously supplied to the evaporator which no longer receives refrigerant. Therefore the refrigerant supply to each of the remaining evaporators increases, and this causes the surface temperature of each of these evaporators to decrease. Therefore increased condensation takes place at the surfaces of the remaining evaporators, and therefore an increased dehumidification is obtained without increasing the refrigeration capacity of the system.

According to one embodiment the first valve part may comprise a first disk having a first set of openings formed therein, and the second valve part may comprise a second disk having a second set of openings defined therein, the first disk and/or the second disk being arranged to perform rotating movements relative to the other disk. The first set of openings and the second set of openings may be arranged in such a manner that openings of the first set of openings and openings of the second set of openings can be arranged at least partly overlappingly in response to a mutual rotational movement of the first disk and the second disk. The openings may each be fluidly connected to one of the outlet openings, and the mutual angular position of the disks may define opening degrees of the expansion valve towards the outlet openings.

According to this embodiment the first disk may be mounted rotatably, while the second disk is mounted fixedly relative to the remaining parts of the expansion valve. As an alternative, the second disk may be mounted rotatably, while the first disk is mounted fixedly relative to the remaining parts of the expansion valve. Finally, the first disk as well as the second disk may be mounted rotatably relative to the remaining parts of the expansion valve and relative to each other. In any event, the mutual position of the disks can be adjusted by rotating one or both of the disks.

When performing mutual rotational movements between the first disk and the second disk, the mutual positions of the openings formed in the two disks is changed. Thus, the overlap between a given opening of the first set of openings and a given opening of the second set of openings is determined by the mutual angular position of the first disk and the second disk. The larger the overlap, the larger a resulting opening defined by the two openings must be expected to be. This resulting opening may advantageously define the opening degree of the expansion valve towards the corresponding outlet opening.

The geometry of the first set of openings and/or the geometry of the second set of openings may define a correspondence between opening degree of the expansion valve towards the outlet openings and mutual angular position of the first disk and the second disk. As mentioned above, the mutual angular position of the first disk and the second disk defines a mutual overlap between corresponding openings formed on the first disk and the second disk, respectively. The geometry, e.g. the size and/or the shape, of one or both of the holes has an influence on the size and shape of a resulting opening formed by the overlap of the two openings in a given mutual angular position of the disks. This will be described in further detail below with reference to the accompanying drawings.

The number of openings formed in the second disk may be larger than the number of openings formed in the first disk. Preferably, the number of openings formed in the first disk corresponds to the number of parallel flow paths, and the openings of the first disk may advantageously each be arranged in fluid contact with one of the flow paths. Some of the openings formed in the second disk may be arranged in such a manner that they can simultaneously be arranged to at least partly overlap one of the openings formed in the first disk. The additional openings formed in the second disk may then be arranged in such a manner that when they are arranged to at least partly overlap one of the openings formed in the first disk, then at least one of the other openings formed in the first disk does not overlap with one of the openings formed in the second disk. In this case it is possible to rotate the disks to a mutual angular position in which fluid flow to at least one of the parallel flow paths is prevented while fluid flow to at least one of the other flow paths is allowed. As described above, this may be used for obtaining dehumidification in the case that the expansion valve is arranged in an air condition system having two or more evaporators fluidly connected in parallel.

The expansion valve may further comprise means for biasing the first disk and the second disk in a direction away from each other. According to this embodiment, the first disk and the second disk are at least not pressed against each other, and preferably a small gap is formed between them. This reduces the friction between the disks, and it is thereby easier to perform relative rotational movements of the disks.

The biasing means may comprise means for regulating at least one pressure occurring at or near the first disk and/or the second disk. This may, e.g., be obtained in the following manner. The first disk may be connected to a piston extending through the second disk. When the pressure at the distal side of the piston is increased, the piston is urged in a direction towards the disks. Since the first disk is connected to the piston, the first disk will thereby be urged in a direction away from the second disk. In addition, the pressure occurring at the opposite side of the piston may be lowered, thereby even further urging the piston in the direction described above.

According to another embodiment the first valve part may comprise a plurality of valve seats and the second valve part may comprise a plurality of valve elements, the valve seats and the valve elements pair-wise forming a plurality of valves, each arranged to control a flow of fluid medium to an outlet opening. According to this embodiment the valve parts define a plurality of separate valves, which are preferably simultaneously operable.

The geometry of the valve seats and/or the geometry of the valve elements may define a correspondence between opening degree of the expansion valve towards the outlet openings and mutual position of the first valve part and the second valve part. For instance, moving the first valve part and/or the second valve part in such a manner that the distance between the valve parts is increased or decreased may advantageously result in the distance between the valve seats and the valve elements being increased or decreased correspondingly. The size and/or shape of the valve seats and/or the valve elements will then define the size and/or shape of an opening occurring between the valve seats and the valve elements in a given mutual position of the first valve part and the second valve part, and thereby the corresponding opening degree towards the parallel flow paths is determined.

The valve elements may be arranged on a part which is substantially linearly movable towards and away from the second valve part. According to this embodiment the valve elements are moved towards or away from the valve seats when the part is moved towards or away from the second valve part, thereby controlling the opening degree as described above.

Movements of the substantially linearly movable part may be driven by an actuator comprising a thermostatic valve. Alternatively, the substantially linearly movable part may be driven by a step motor, a solenoid, or any other suitable means. The actuator is preferably arranged to simultaneously control the opening degree of each of the valve seat/valve element pairs.

According to yet another embodiment the first valve part may comprise a plurality of valve elements, each arranged movably relative to a valve seat, each valve element/valve seat pair being arranged to control a flow of liquid medium to an outlet opening, and the second valve part may comprise a cam shaft arranged to abut the valve elements in such a manner that a position of the cam shaft determines the mutual positions of the valve elements and the valve seats. According to this embodiment the mutual position between the cam shaft and the valve elements determines the positions of the valve elements relative to the valve seats, and thereby the opening degree of each of the valves defined by the valve element/valve seat pairs. The cam shaft may comprise a plurality of cams, protrusions or the like, e.g. one cam/protrusion per valve element, and the position of the cam shaft may determine the mutual position between a valve element and a corresponding cam/protrusion.

The cam shaft may be rotatably movable relative to the valve elements. According to this embodiment the cam shaft may advantageously be shaped in such a manner that a distance from a centre axis of the cam shaft to a surface part of the cam shaft arranged in abutment with a valve element depends upon the angular position of the cam shaft. In this case rotation of the cam shaft will alter the distance between the centre axis of the cam shaft and the abutment point between the cam shaft and the valve element, and thereby the valve element will be moved correspondingly. As a consequence, the valve element moves relative to the valve seat, thereby adjusting the opening degree, and consequently controlling the flow of liquid medium.

Alternatively or additionally, the cam shaft may be translationally movable relative to the valve elements. Similarly to the situation described above, the cam shaft may be shaped in such a manner that translational movements of the cam shaft, e.g. along an axial direction, results in a distance between a centre axis of the cam shaft and an abutment point between the cam shaft and a valve element being altered, thereby moving the valve element correspondingly.

Movements of the cam shaft may be driven by an actuator comprising a thermostatic valve. Alternatively, the cam shaft may be driven by a step motor, a solenoid, or any other suitable means. The actuator is preferably arranged to simultaneously control the opening degree of each of the valve seat/valve element pairs.

The cam shaft may be movable into a position in which at least one of the valve element/valve seat pairs prevents fluid flow to the corresponding flow path. In a preferred embodiment the cam shaft may be moved rotationally in order to simultaneously control flow of fluid medium to each of the parallel outlet openings, i.e. during normal operation, and the cam shaft may be moved translationally in order to move the cam shaft into a position in which fluid flow to at least one of the outlet openings is prevented. As described above, such a position may be used for increasing dehumidification without increasing refrigeration capacity.

The expansion valve may further comprise an actuator arranged for driving relative movements of the first valve part and the second valve part in such a manner that fluid flow to each of the at least two outlet openings is thereby simultaneously controlled. According to this embodiment a single actuator is used for driving the relative movements of the first valve part and the second valve part. This movement results in simultaneous adjustment or control of the fluid flow delivered to each of the outlet openings. In the case that the valve elements are mutually rotating disks, this may be obtained by letting the actuator rotate one of the disks, thereby simultaneously adjusting the degree of overlap between corresponding openings formed in the disks. In the case that the valve elements comprise valve seat/valve element pairs, this may be obtained by arranging the actuator to simultaneously move each of the valve seats or each of the valve elements to simultaneously adjust the degree of opening of each of the valve seat/valve element pairs.

According to a second aspect of the invention the above and other objects are fulfilled by providing a refrigeration system comprising:
- at least one compressor,
- at least one condenser,
- at least two evaporators arranged in parallel along a refrigerant flow path of the refrigeration system, and
- a expansion valve according to the first aspect of the invention, said expansion valve being arranged in such a manner that each of the at least two outlet openings is arranged to deliver refrigerant to one of the evaporators.

It should be noted that a person skilled in the art would readily recognise that any feature described in combination with the first aspect of the invention could also be combined with the second aspect of the invention and vice versa.

The refrigeration system may comprise only one compressor. Alternatively it may comprise two or more compressors, e.g. arranged in a compressor rack.

The refrigeration system may be an air condition system. Alternatively, it may be a refrigeration system of the kind used in cooling furniture or freezers in a supermarket.

BRIEF DESCRIPTION OF THE DRAWINGS

The invention will now be described in further detail with reference to the accompanying drawings in which.

DETAILED DESCRIPTION OF THE PREFERRED EMBODIMENTS

Figure 1:
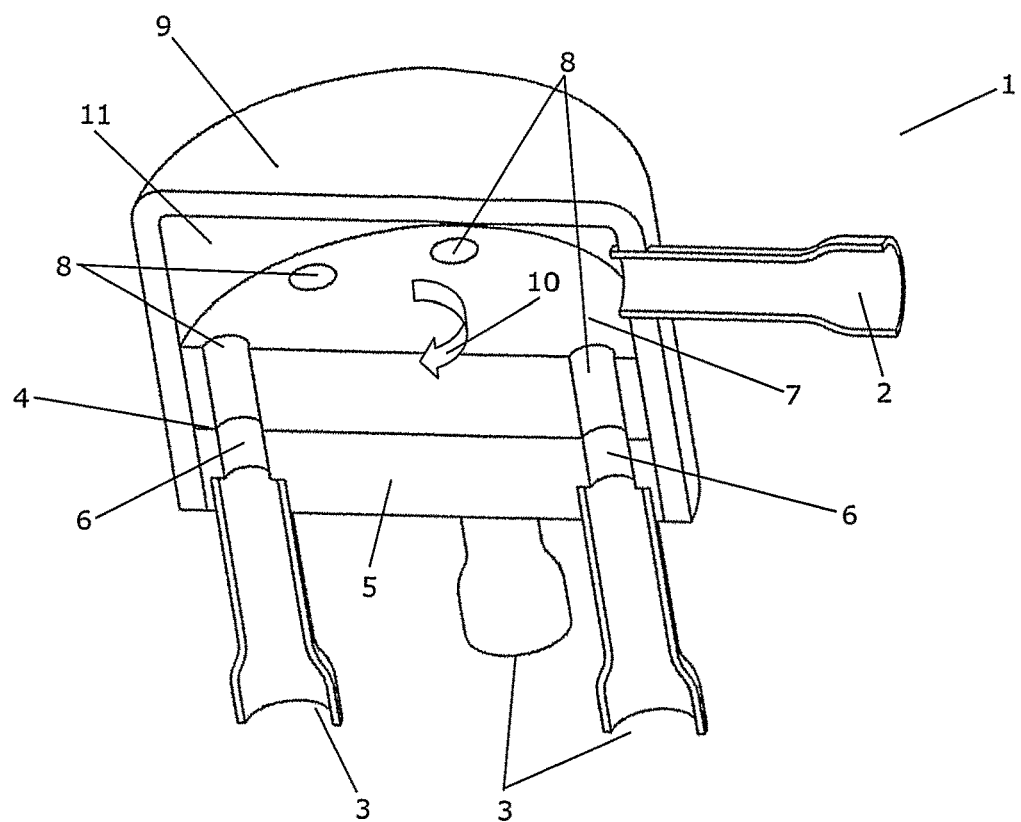
FIG. 1 is a perspective view of a cut through an expansion valve according to a first embodiment of the invention.

FIG. 1 is a perspective view of a cut through an expansion valve 1 according to a first embodiment of the invention. The expansion valve 1 comprises an inlet opening 2 adapted to receive fluid medium in a liquid state. Thus, the inlet opening 2 is connectable to a source of fluid medium in a liquid state. The expansion valve 1 further comprises four outlet openings 3, three of which are visible, the outlet openings 3 being arranged fluidly in parallel.

The expansion valve 1 further comprises a distributor 4 comprising an orifice disk 5 being provided with four openings 6, three of which are visible, and a distributor disk 7 being provided with six openings 8, four of which are visible. The orifice disk 5 is mounted fixedly relative to the outlet openings 3, and each of the openings 6 is arranged at a position corresponding to an outlet opening 3. The distributor disk 7 is arranged rotatably relative to the orifice disk 5 and to a housing 9 of the expansion valve 1, as indicated by arrow 10. Thereby the openings 8 provided in the distributor disk 7 are angularly movable relative to the openings 6 provided in the orifice disk 5, and the mutual angular position of the orifice disk 5 and the distributor disk 7 defines mutual overlaps between the openings 6, 8. In FIG. 1 the distributor disk 7 is arranged in an angular position in which four of the openings 8 of the distributor disk 7 overlap completely with the four openings 6 of the orifice disk 5. Accordingly, the opening degree of the expansion valve 1 is the largest possible, i.e. fluid medium is allowed to flow from the inlet opening 2, via volume 11 defined between the housing 9 and the distributor disk 7, to each of the outlet openings 3 to the largest possible extent.

Figure 2:
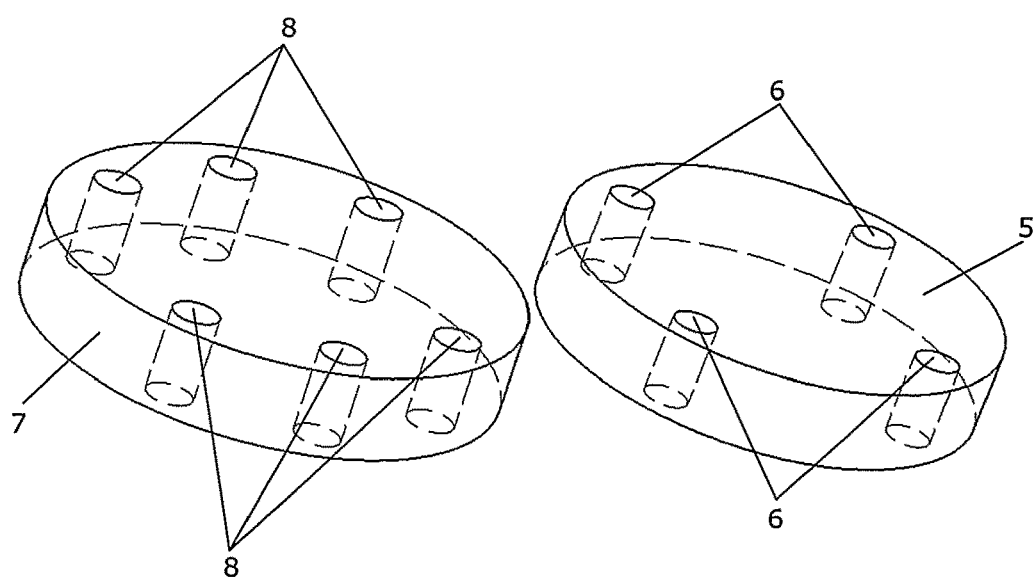
FIG. 2 shows perspective views of a first valve part and a second valve part for the expansion valve of FIG. 1.

FIG. 2 shows perspective views of two valve parts for use in the expansion valve 1 of FIG. 1, in the form of the orifice disk 5 and the distributor disk 7. The positions of the openings 6, 8 provided in the disks 5, 7 are clearly seen.

Figure 3:
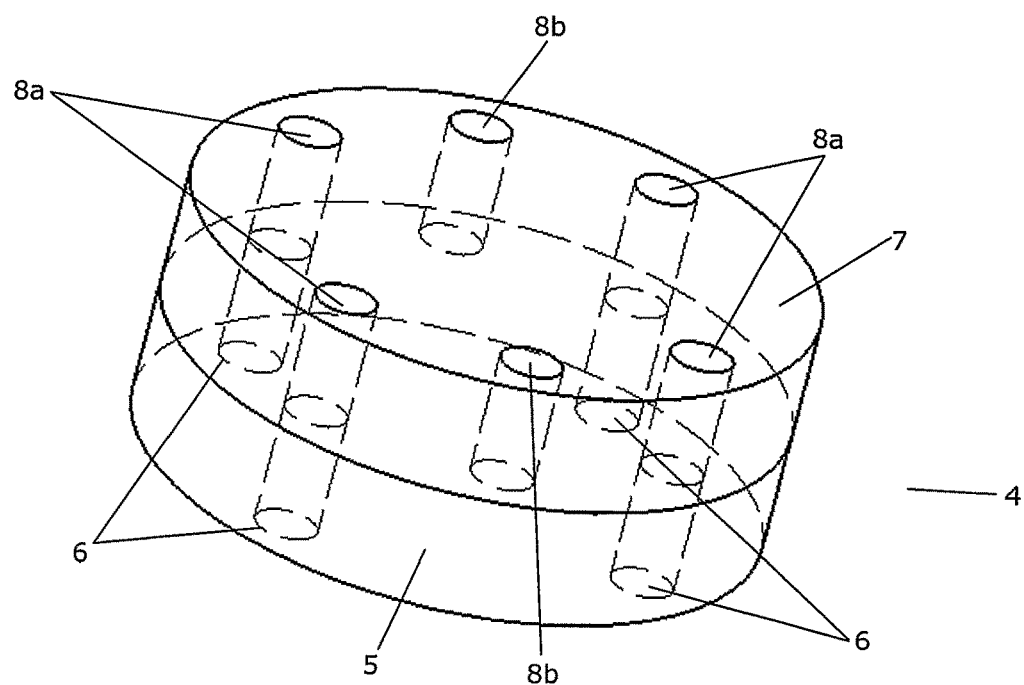
FIG. 3 is a perspective view of the valve parts of FIG. 2 in a first mutual position.

FIG. 3 is a perspective view of a distributor 4 for use in the expansion valve 1 of FIG. 1. More particularly, FIG. 3 shows the orifice disk 5 and the distributor disk 7 arranged relative to each other as they will normally be when mounted in an expansion valve 1. In FIG. 3 the mutual angular position between the orifice disk 5 and the distributor disk 7 is identical to the mutual angular position shown in FIG. 1. Accordingly, each of the openings 8a is arranged in a manner which provides complete overlap between the opening 8a and one of the openings 6 provided in the orifice disk 5, and the expansion valve 1 is thereby in a completely open state as described above. However, the openings 8b are both arranged in an angular position in which there is no overlap with one of the openings 6 of the orifice disk 5, and fluid medium can therefore not pass through these openings. The function of the openings 8b will be described further below.

Figure 4:
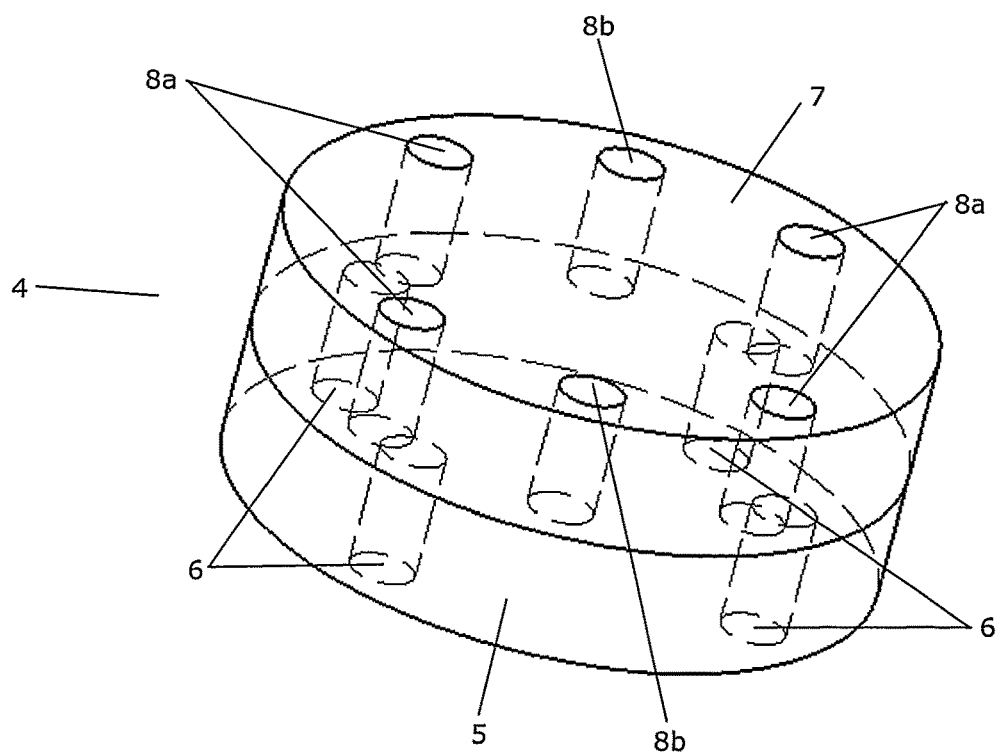
FIG. 4 is a perspective view of the valve parts of FIG. 2 in a second mutual position.

FIG. 4 is a perspective view of the distributor 4 of FIG. 3. In FIG. 4 the distributor disk 7 has been rotated slightly relative to the orifice disk 5, as compared to the situation shown in FIG. 3. The openings 8a are still arranged in angular positions in which an overlap between each of the openings 8a and a corresponding opening 6 formed in the orifice disk 5 is defined. However, in FIG. 4 the defined overlaps are not complete, and the resulting opening through which fluid medium is allowed to pass is thereby much smaller than it is the case in the situation shown in FIG. 3. Accordingly, the opening degree of the expansion valve 1 is smaller. The openings 8b are still arranged in angular positions in which they do not define an overlap with the openings 6 provided in the orifice disk 5.

Figure 5:
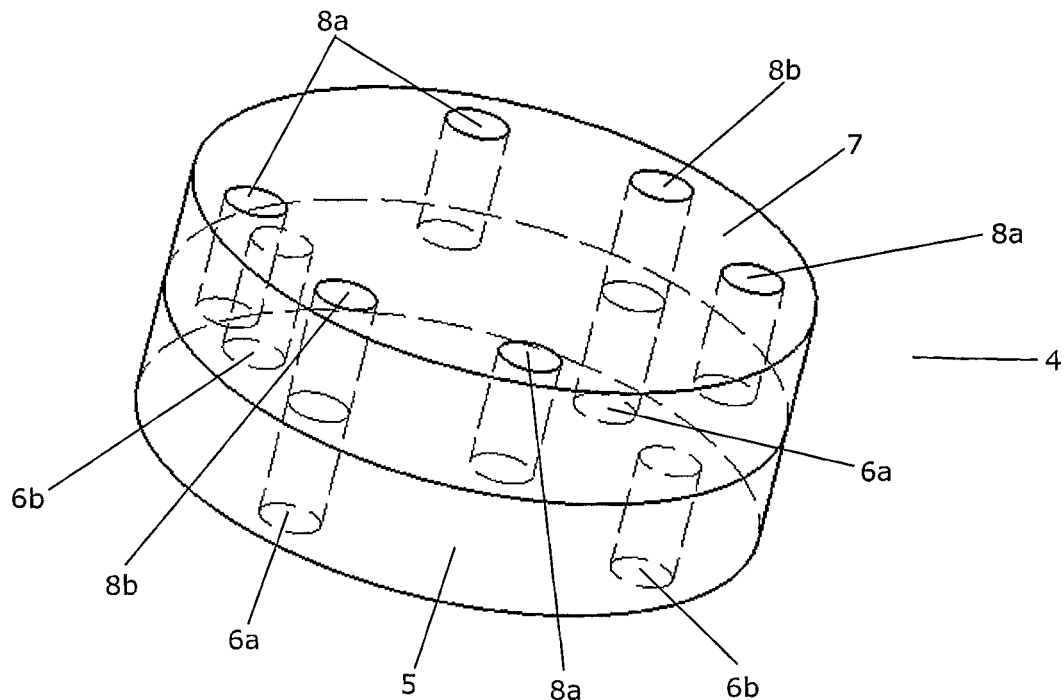
FIG. 5 is a perspective view of the valve parts of FIG. 2 in a third mutual position.

FIG. 5 is a perspective view of the distributor 4 of FIGS. 3 and 4. In FIG. 5 the distributor disk 7 has been rotated to an angular position in which each of the openings 8b completely overlaps one of the openings 6a provided in the orifice disk 5. However, only two of the openings 6a overlap with a corresponding opening 8b. Accordingly, fluid medium is only allowed to flow to the two outlet opening connected to the corresponding openings 6a, and flow of fluid medium to the outlet openings connected to the openings 6b is prevented in the situation shown in FIG. 5. As described above, when the distributor 4 is in this position, and in the case that the expansion valve 1 is arranged in an air condition system, increased dehumidification of a refrigerated volume can be obtained without increasing the refrigeration capacity.

Figure 6:
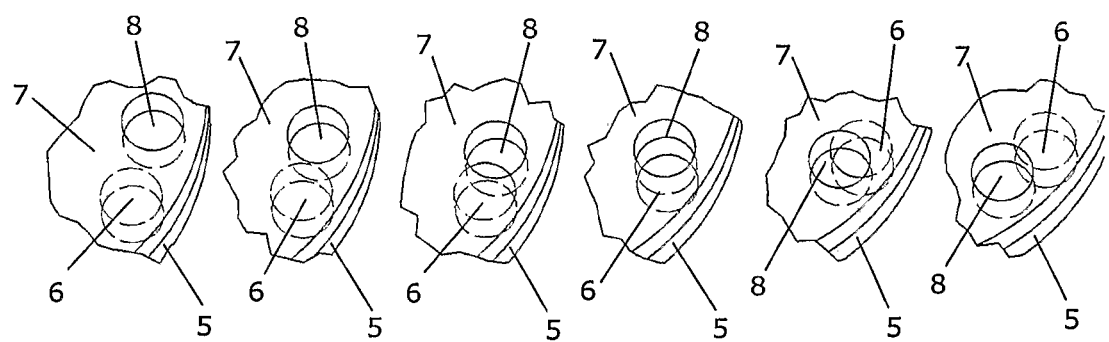
FIG. 6 illustrates a movement sequence between valve parts for the expansion valve of FIG. 1, the valve parts comprising circular openings.

FIG. 6 illustrates a movement sequence between an orifice disk 5 and a distributor disk 7. The openings 6, 8 provided in the orifice disk 5 and the distributor disk 7, respectively, both have a circular shape. In FIG. 6 the distributor disk 7 is rotated from a position where the openings 6, 8 are non-overlapping, towards positions where they start overlapping, the overlap increasing until the openings 6, 8 overlap completely, and further on in such a manner that the overlap decreases until the openings 6, 8 no longer overlap.

Figure 7:
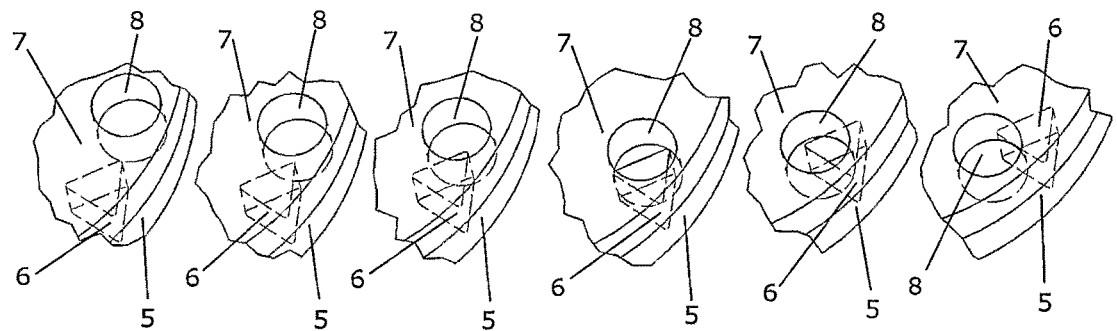
FIG. 7 illustrates a movement sequence between valve parts for the expansion valve of FIG. 1, one of the valve parts comprising triangular opening.

FIG. 7 also illustrates a movement sequence between an orifice disk 5 and a distributor disk 7, similar to the movement sequence of FIG. 6. However, in FIG. 7 the opening 6 provided in the orifice disk 5 has a triangular shape, while the opening 8 defined in the distributor disk 7 is circular as it is the case in FIG. 6. As a consequence, a complete overlap between the openings 6, 8 is not possible. However, during the movement sequence, the distributor disk 7 is rotated from a position where the openings 6, 8 are non-overlapping, towards a position where a maximum overlap is obtained, and further on in such a manner that the overlap decreases until the openings 6, 8 no longer overlap.

Figure 8:
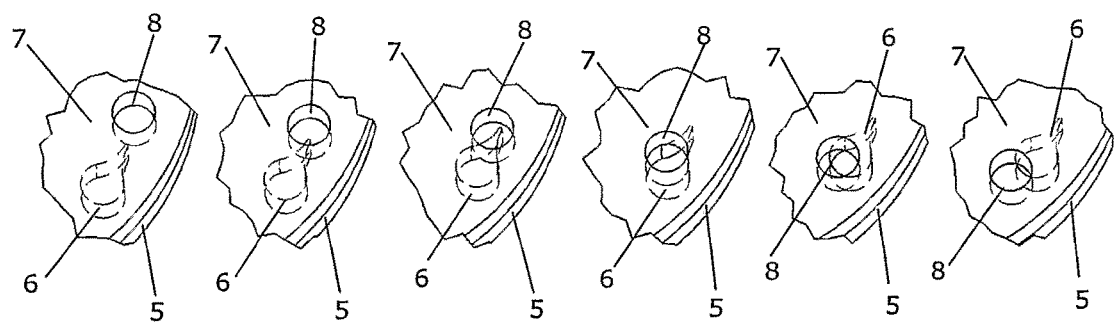
FIG. 8 illustrates a movement sequence between valve parts for the expansion valve of FIG. 1, one of the valve parts comprising openings of a teardrop shape.

FIG. 8 also illustrates a movement sequence between an orifice disk 5 and a distributor disk 7, similar to the movement sequences of FIGS. 6 and 7. However, in FIG. 8 the opening 6 provided in the orifice disk 5 has a teardrop shape, and the opening 8 provided in the distributor disk 7 has a circular shape. Apart from this, the movement sequence illustrated in FIG. 8 is similar to the movement sequences of FIGS. 6 and 7 described above.

In each of the movement sequences illustrated in FIGS. 6-8 the overlap between the openings 6, 8 corresponding to a specific mutual angular position between the orifice disk 5 and the distributor disk 7 is determined by the shapes of the openings 6, 8. Thus, the opening degree of the expansion valve corresponding to a specific mutual angular position is also determined by the shapes of the openings 6, 8.

Figure 9:
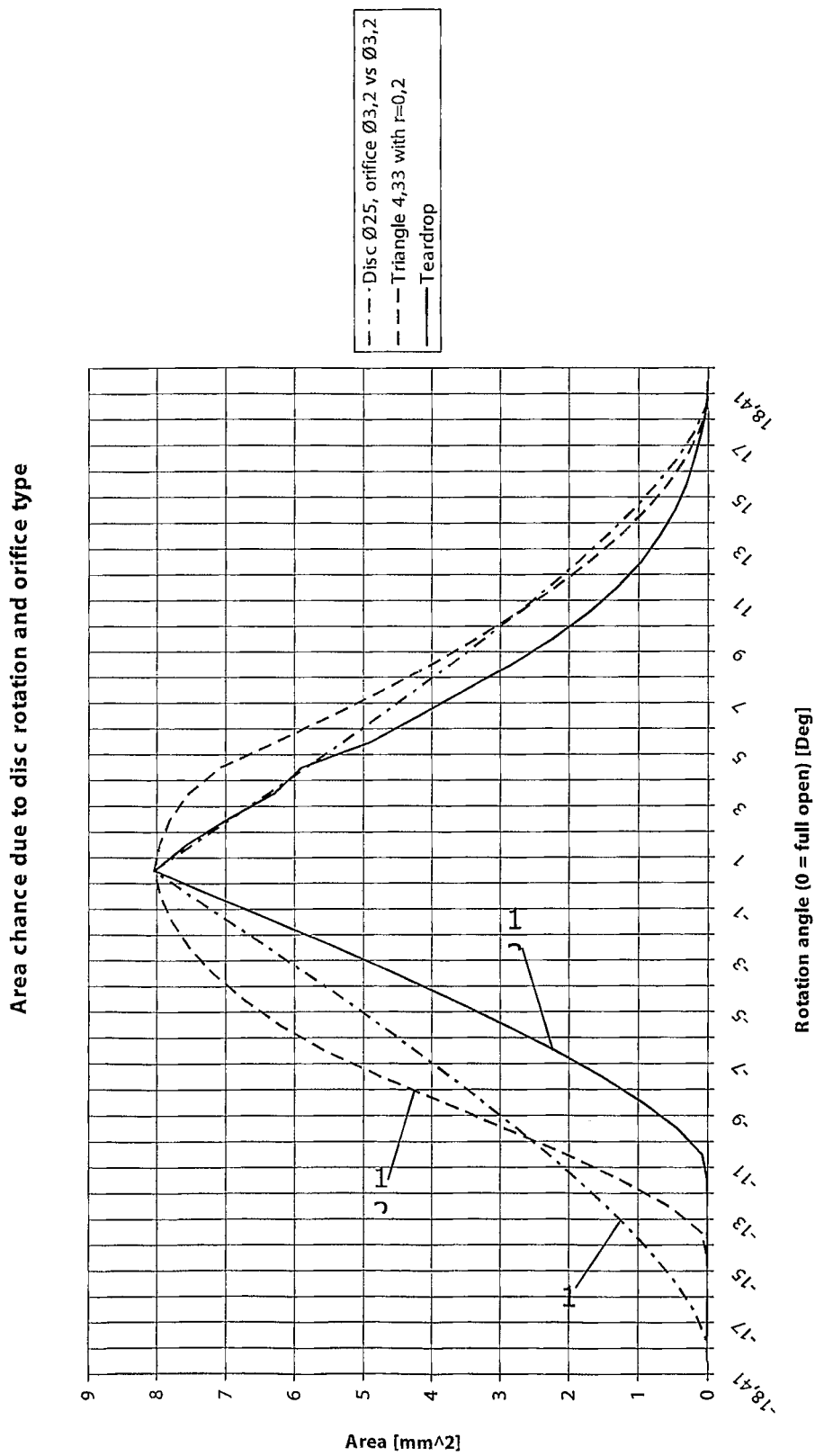
FIG. 9 is a graph comparing opening degree as a function of rotation angle between the first valve part and the second valve part for the valve parts of FIGS. 6-8.

FIG. 9 is graph showing opening degree as a function of rotation angle between the orifice disk 5 and the distributor disk 7 corresponding to FIGS. 6-8. Graph 11 corresponds to FIG. 6, i.e. both openings 6, 8 have a circular shape, graph 12 corresponds to FIG. 7, i.e. opening 6 has a triangular shape, and graph 13 corresponds to FIG. 8, i.e. opening 6 has a teardrop shape. It is clear from FIG. 9 that the opening degree corresponding to a given rotation angle differs significantly for the three different shapes of the opening 6. Thus, by carefully designing the shapes of the openings 6, 8 it is possible to obtain a desired correspondence between rotational angle and opening degree. This makes it possible to easily control the opening degree of the expansion valve in a desired manner.

Figure 10:
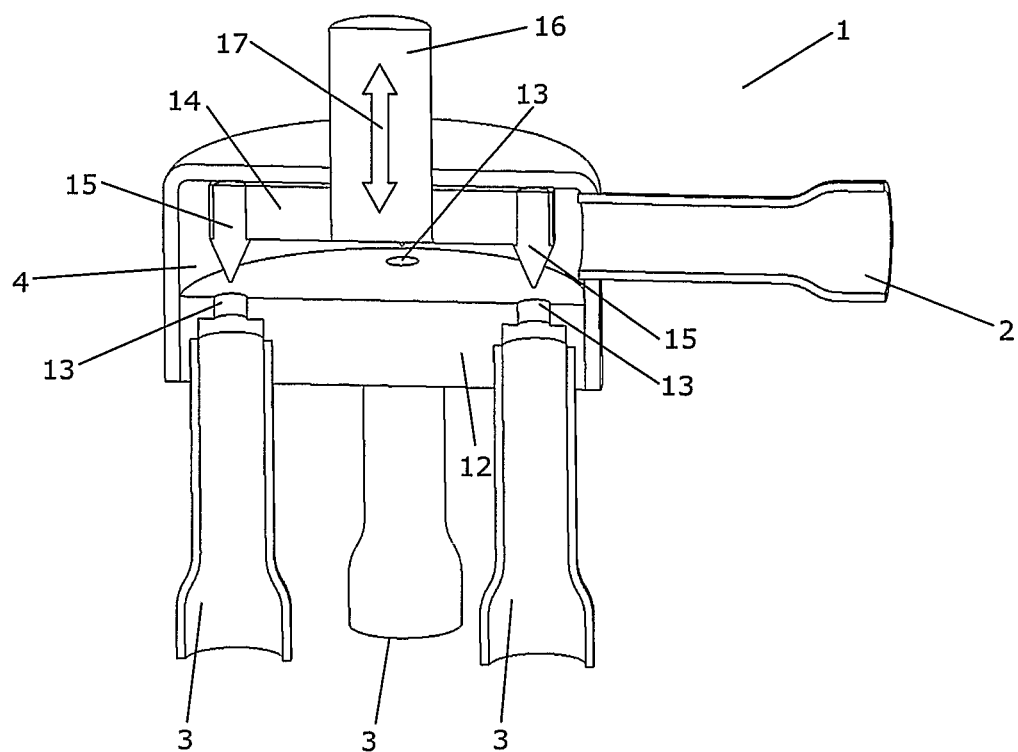
FIG. 10 is a perspective view of a cut through an expansion valve according to a second embodiment of the invention.

FIG. 10 is a perspective view of a cut through an expansion valve 1 according to a second embodiment of the invention. Similarly to the embodiment shown in FIG. 1, the expansion valve 1 of FIG. 10 comprises an inlet opening 2 and four outlet openings 3, three of which are visible, the outlet openings 3 being arranged fluidly in parallel.

The expansion valve 1 further comprises a distributor 4 comprising an orifice plate 12 having four valve seats 13 formed therein, three of which are visible. Each of the valve seats 13 is arranged in fluid connection with one of the outlet openings 3.

The distributor 4 further comprises a movable disk 14 having four valve elements 15 arranged thereon. Two of the valve elements 15 are visible in FIG. 10. Each of the valve elements 15 is arranged at a position corresponding to the position of a valve seat 13. Accordingly, each valve seat 13/valve element 15 pair forms a valve which is arranged to control fluid flow to an outlet opening 3.

The movable disk 14 is connected to an actuator 16 which, when actuated, causes substantially linear movement of the movable disk 14 along the direction indicated by arrow 17. When the movable disk 14 is moved in a direction towards the orifice plate 12 each of the valve elements 15 is moved towards its corresponding valve seat 13, thereby reducing the opening degrees of the valves defined by the valve seat 13/valve element 15 pairs. Correspondingly, when the movable disk 14 is moved in an opposite direction, i.e. away from the orifice plate 12, each of the valve elements 15 is moved away from its corresponding valve seat 13, thereby increasing the opening degrees of the valves. In FIG. 10 the movable disk 14 is in a position defining the largest possible opening degree for the expansion valve 1, since the movable disk 14 is arranged as far away from the orifice plate 12 as possible. It is clear that in this position substantially free passage for fluid medium is allowed through the orifice plate 12 via the valve seats 13.

Figure 11:
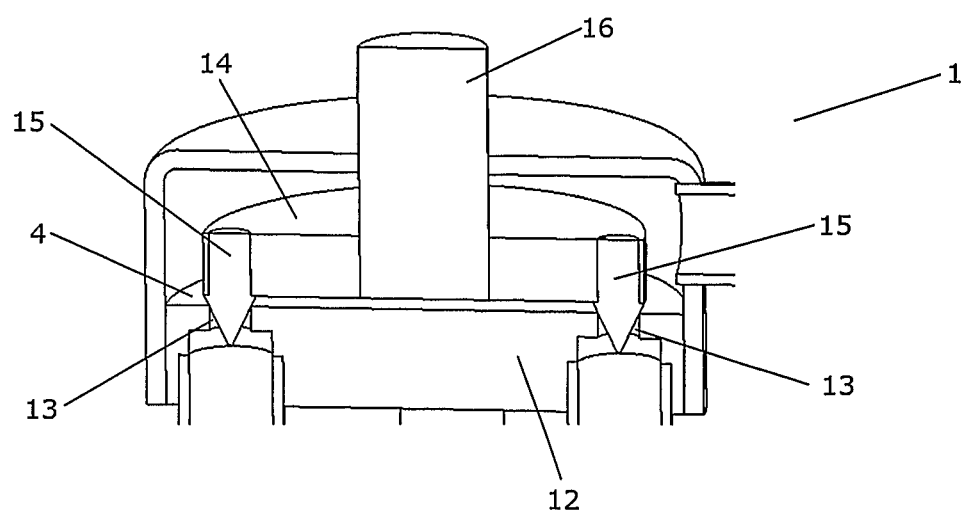
FIG. 11 shows valve parts of the expansion valve of FIG. 10 in a first mutual position.

FIG. 11 shows part of the expansion valve 1 of FIG. 10. In FIG. 11 the expansion valve 1 is shown in a closed position. Thus, the movable disk 14 is arranged as close as possible to the orifice plate 12. It can be seen that each of the valve elements 15 is arranged relative to its corresponding valve seat 13 in such a manner that flow of fluid medium through the valve seats 13 is substantially prevented.

Figure 12:
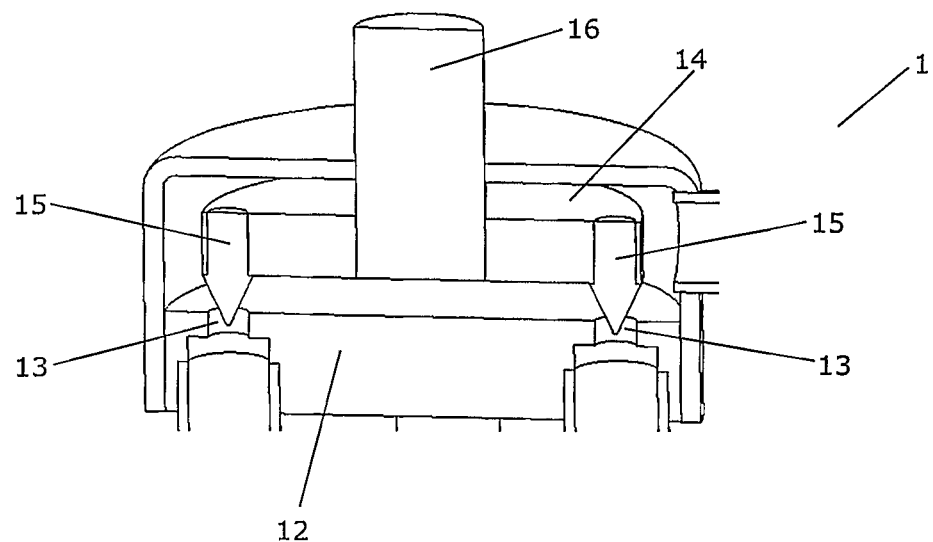
FIG. 12 shows valve parts of the expansion valve of FIG. 10 in a second mutual position.

FIG. 12 shows part of the expansion valve 1 of FIG. 10. In FIG. 12 the expansion valve 1 is shown in a limited capacity position. Thus, the movable disk 14 is arranged between the extreme positions defining a fully open and a fully closed expansion valve 1. It can be seen that each of the valve elements 15 is arranged relative to its corresponding valve seat 13 in such a manner that a limited flow of fluid medium is allowed to pass through the valve seat 13.

Figure 13:
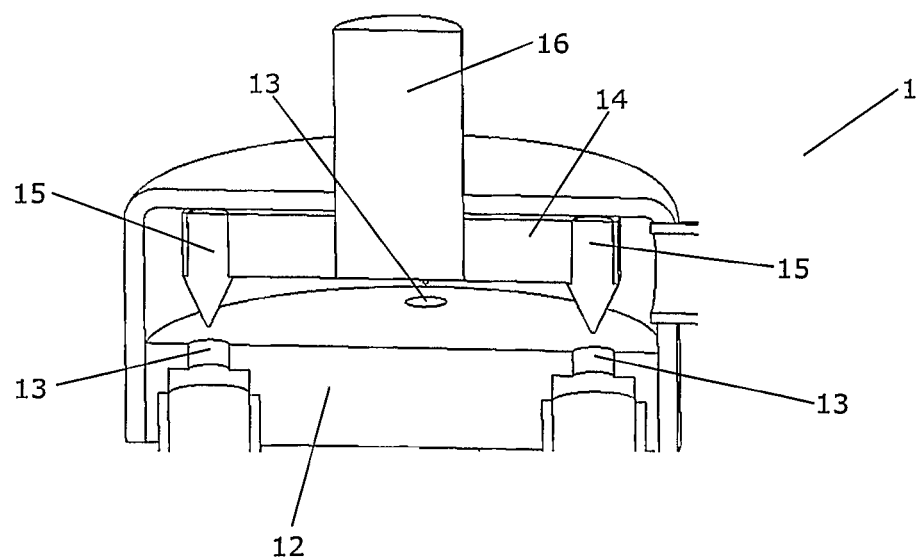
FIG. 13 shows valve parts of the expansion valve of FIG. 10 in a third mutual position.

FIG. 13 shows part of the expansion valve 1 of FIG. 10. In FIG. 13 the expansion valve 1 is shown in a fully open position, identical to the situation shown in FIG. 10.

Figure 14:
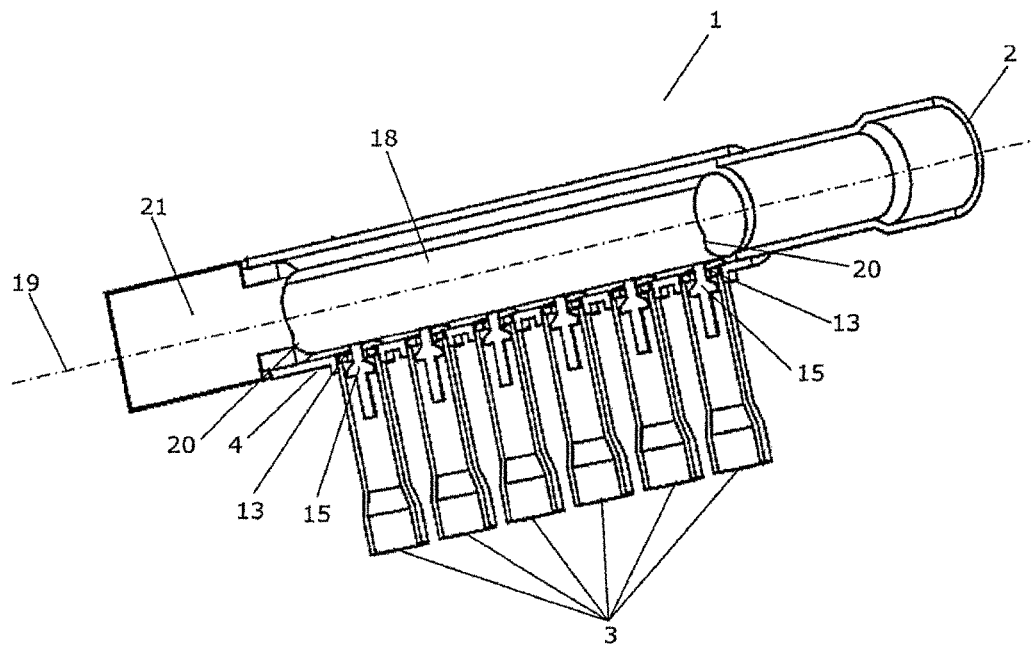
FIG. 14 is a perspective view of a cut through an expansion valve according to a third embodiment of the invention, the expansion valve being in an open position.

FIG. 14 is a perspective view of a cut through an expansion valve 1 according to a third embodiment of the invention. The expansion valve 1 of FIG. 14 comprises an inlet opening 2 adapted to receive fluid medium in a liquid state. Thus, the inlet opening 2 is connectable to a source of fluid medium in a liquid state. The expansion valve 1 further comprises six outlet openings 3 being arranged fluidly in parallel.

The expansion valve 1 further comprises a distributor 4 comprising a cam shaft 18 and six valve seat 13/valve element 15 pairs, each being fluidly connected to an outlet opening 3. The cam shaft 18 is arranged in abutment with the valve elements 15, and each of the valve elements 15 is biased in a direction towards the cam shaft 18, thereby ensuring tight abutment between the cam shaft 18 and the valve elements 15.

The cam shaft 18 is arranged rotatably about a centre axis 19. It is shaped in such a manner that the radius of the cross section of the cam shaft 18 varies as a function of angular position relative to the centre axis 19. This is particularly clear from the abrupt change in radius at position corresponding to main cam 20. Thus, the distance from the centre axis 19 to the part of the outer surface of the cam shaft 18 which abuts the valve elements 15 depends upon the angular position of the cam shaft 18 about the centre axis 19. Accordingly, the position of the valve elements 15 relative to the valve seats 13 is also determined by the angular position of the cam shaft 18.

In FIG. 14 the expansion valve 1 is shown in an open position, i.e. the cam shaft 18 is arranged in an angular position which defines the largest possible distance between the centre axis 19 and the part of the cam shaft 18 abutting the valve elements 15. Thereby the valve elements 15 are pushed in a direction towards the outlet openings 3 and away from the valve seats 13 to the largest possible extent, thereby allowing a maximum flow of fluid medium towards the outlet openings 3 via the valve seats 13.

The cam shaft 18 is rotated by means of actuator 21.

Figure 15:
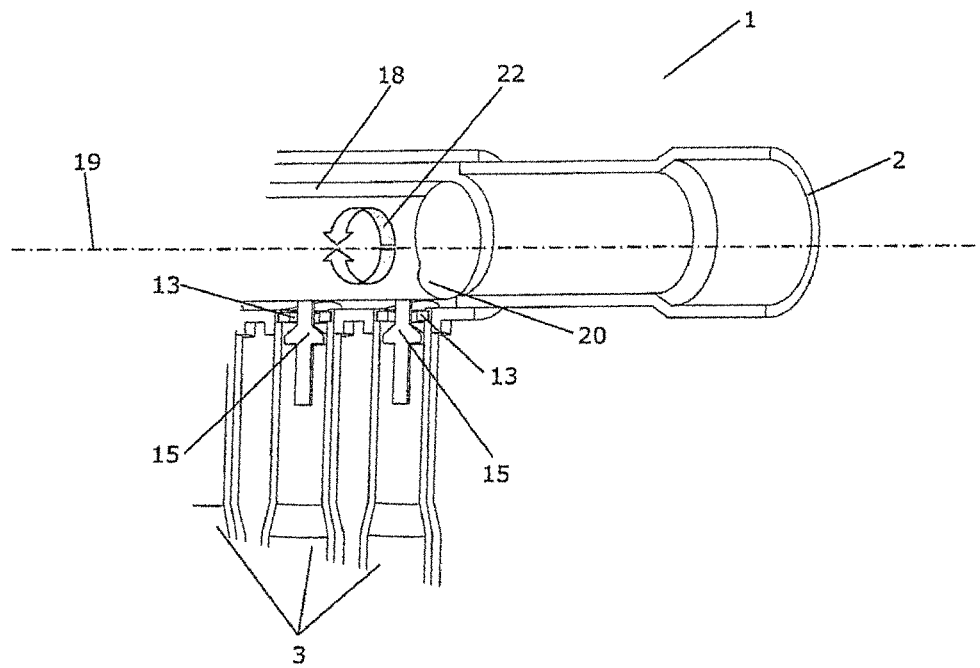
FIG. 15 shows a detail of the expansion valve of FIG. 14.

FIG. 15 is a detail of the expansion valve 1 of FIG. 14. Arrow 22 indicates that the cam shaft 18 is allowed to perform rotational movements about the centre axis 19. It can clearly be seen that the valve elements 15 are arranged relative to the valve seats 13 in such a manner that a maximum flow of fluid medium is allowed towards the outlet openings 3.

Figure 16:
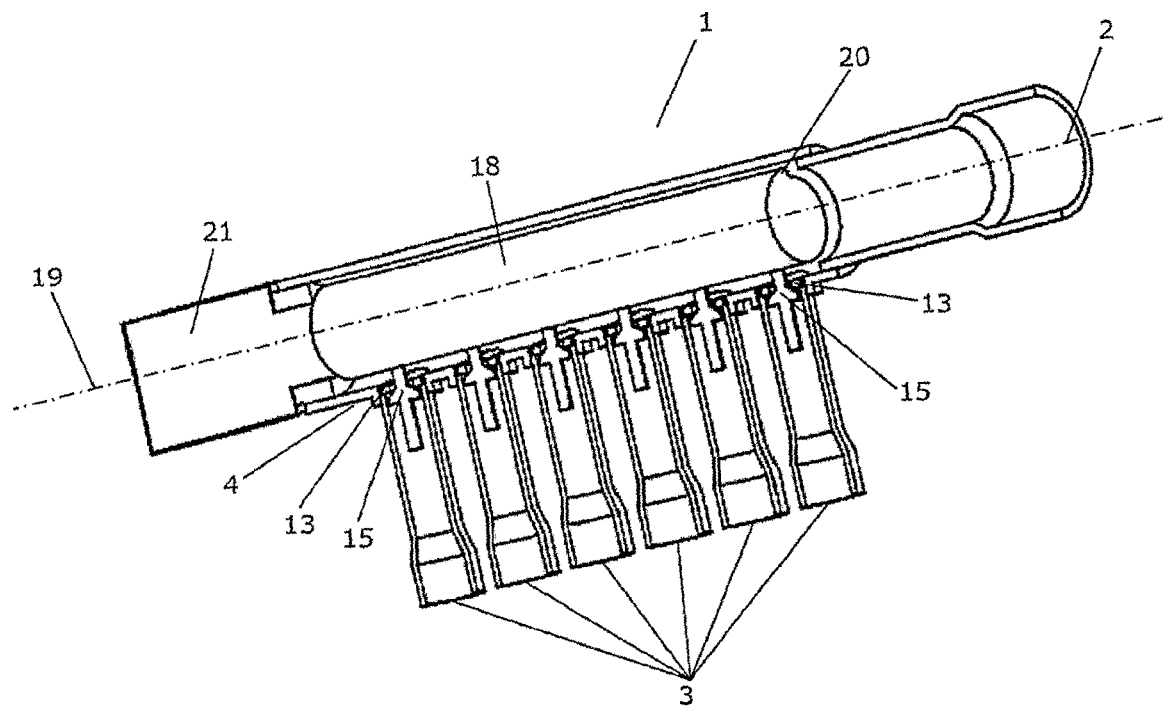
FIG. 16 shows the expansion valve of FIG. 14 in a closed position.

FIG. 16 shows the expansion valve 1 of FIG. 14 in a closed position. It can be seen that the cam shaft 18 has been rotated into a position in which the distance between the centre axis 19 and the part of the outer surface of the cam shaft 18 which abuts the valve elements 15 is smaller than it is the case in FIGS. 14 and 15. It can also be seen that this has the consequence that the valve elements 15 are arranged relative to the valve seats 13 in such a manner that flow of fluid towards the outlet openings 3 is substantially prevented.

Figure 17:
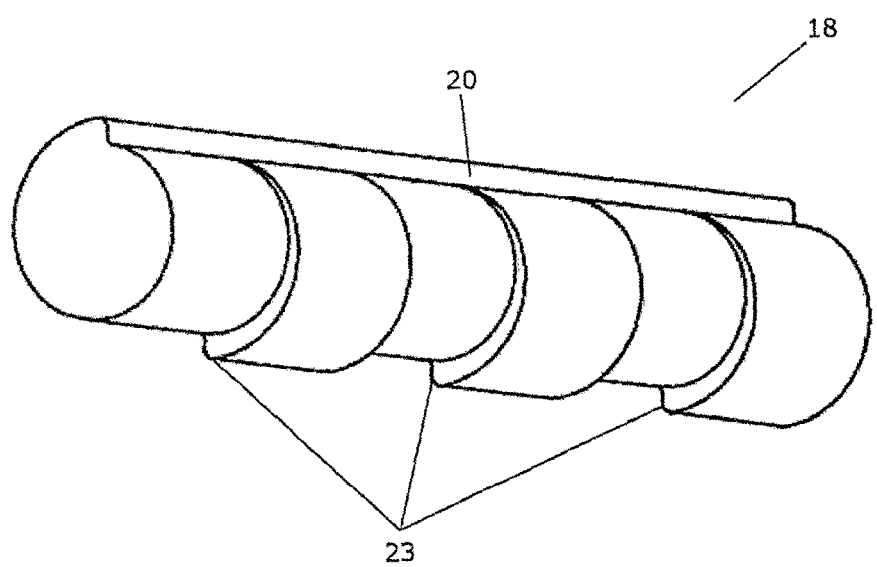
FIG. 17 is a perspective view of a cam shaft for use in the expansion valve of FIGS. 14-16.

FIG. 17 shows a cam shaft 18 which may be used in the expansion valve 1 of FIGS. 14-16. Apart from the main cam 20 which is described above with reference to FIGS. 14-16, and which ensures that the valve elements 15 are arranged at similar positions relative to their respective valve seats 13, the cam shaft 18 shown in FIG. 17 is provided with three additional cams 23 arranged substantially opposite the position of the main cam 20. The additional cams 23 are arranged in such a manner that when the cam shaft 18 is arranged in an expansion valve 1 as shown in FIGS. 14-16, the cam shaft 18 can be rotated to a position where each of the three additional cams 23 abut a valve element 15. Thereby the three valve elements 15 being in abutment with the additional cams 23 are pushed in a direction towards the corresponding outlet openings 3, thereby allowing flow of fluid medium towards these three outlet openings 3, while the remaining three valve elements 15 remain in a position in which flow of fluid medium towards the corresponding outlet openings 3 is prevented. Thus, when the cam shaft 18 is in this position, flow of fluid medium is allowed towards some of the outlet openings 3, and prevented towards the remaining outlet openings 3. As described above, a situation is thereby obtained in which increased dehumidification can be obtained without increasing the refrigeration capacity.

Figure 18:
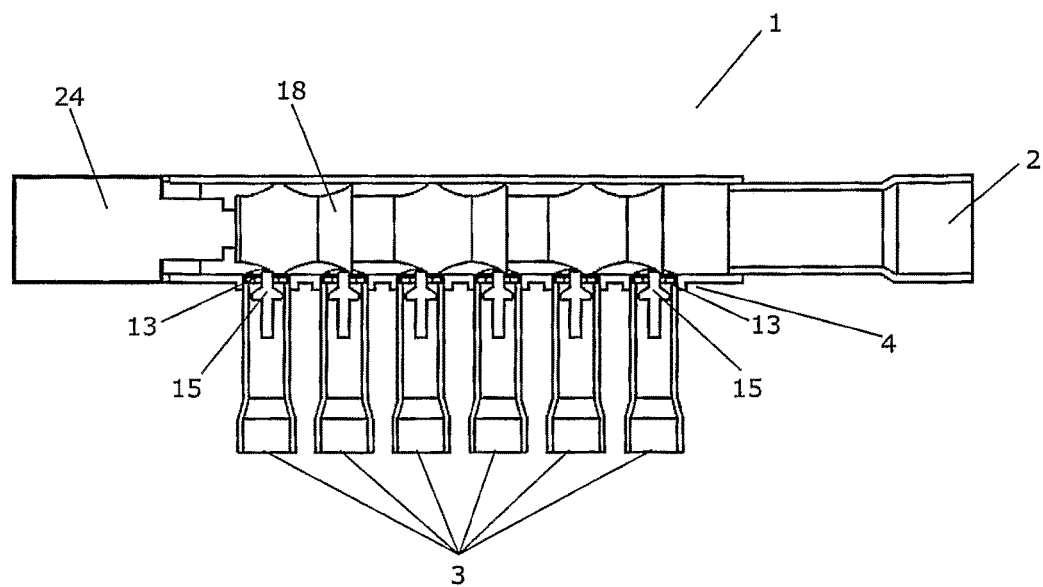
FIG. 18 is a perspective view of a cut through an expansion valve according to a fourth embodiment of the invention, the expansion valve being in an open position.

FIG. 18 is a perspective view of a cut through an expansion valve 1 according to a fourth embodiment of the invention. The expansion valve 1 comprises an inlet opening 2 and six outlet openings 3 arranged fluidly in parallel.

The expansion valve 1 further comprises a distributor 4 comprising a cam shaft 18 and six valve seat 13/valve element 15 pairs, each being fluidly connected to an outlet opening 3. The cam shaft 18 is arranged in abutment with the valve elements 15, and each of the valve elements 15 is biased in a direction towards the cam shaft 18, thereby ensuring tight abutment between the cam shaft 18 and the valve elements 15.

The cam shaft 18 is linearly movable, and the distance from a centre axis (not shown) of the cam shaft 18 and an outer surface of the cam shaft 18 abutting the valve elements 15 depends upon the translational position along the length of the centre axis. Accordingly, moving the cam shaft 18 linearly causes the valve elements 15 to move relative to the valve seats 13, thereby changing the opening degree of the expansion valve 1, similarly to the situation described above with reference to FIGS. 14-16.

The cam shaft 18 is moved by means of actuator 24.

In FIG. 18 the expansion valve 1 is shown in an open position.

Figure 19:
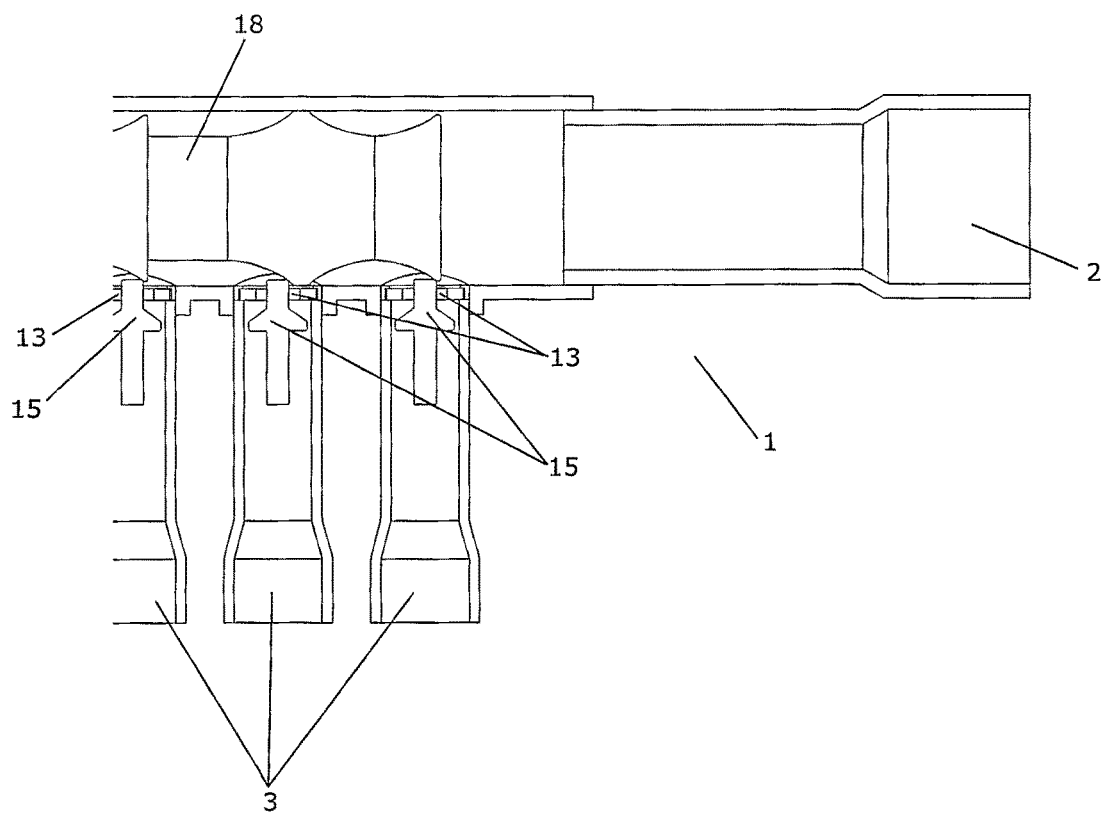
FIG. 19 shows a detail of the expansion valve of FIG. 18.

FIG. 19 is a detail of the expansion valve 1 of FIG. 18. It is clear that the cam shaft 18 is arranged translationally in a position which causes the valve elements 15 to be arranged relative to the valve seats 13 in such a manner that a maximum flow of fluid medium is allowed to flow towards the outlet openings 3.

Figure 20:
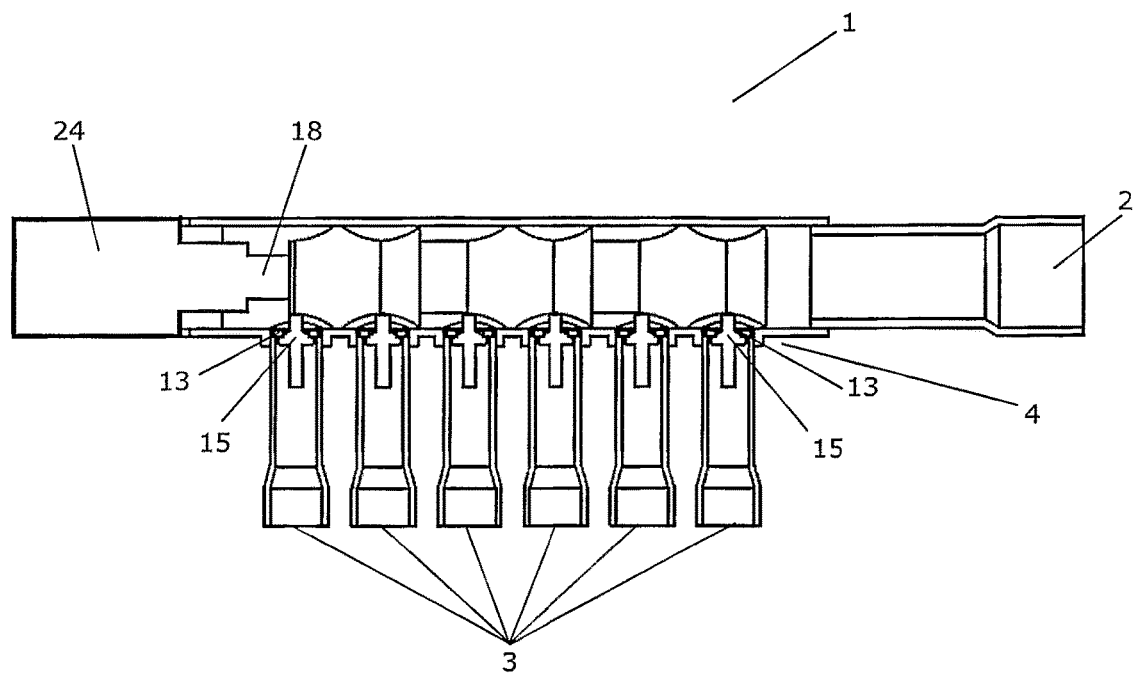
FIG. 20 shows the expansion valve of FIG. 18 in a closed position.

FIG. 20 shows the expansion valve 1 of FIG. 18. In FIG. 20 the cam shaft 18 has been moved to a position in which it causes each of the valve elements 15 to be in a position relative to its corresponding valve seat 13 in which flow of fluid medium is prevented towards each of the outlet openings 3. Accordingly, the expansion valve 1 is in a closed position.

Figure 21:
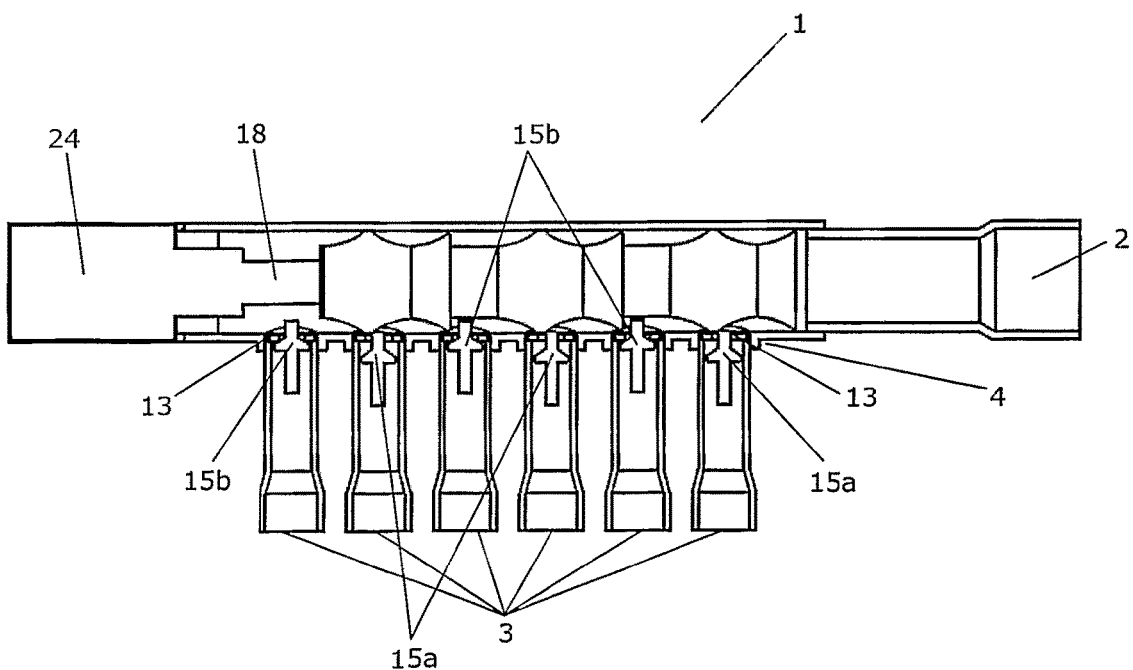
FIG. 21 shows the expansion valve of FIGS. 18-20 in a position in which fluid flow to some of the outlet openings is prevented.

FIG. 21 shows the expansion valve of FIGS. 18-20. In FIG. 21 the cam shaft 18 has been moved to a position in which three of the valve elements 15a are arranged relative to the corresponding valve seats 13 in such a manner that flow of fluid medium towards the corresponding outlet openings 3 is allowed. Simultaneously, the remaining three valve elements 15b are arranged relative to the corresponding valve seats 13 in such a manner that flow of fluid medium towards the corresponding outlet openings 3 is prevented. As described above, a situation has thereby been provided in which increased dehumidification can be obtained without increasing the refrigeration capacity.

While the present invention has been illustrated and described with respect to a particular embodiment thereof, it should be appreciated by those of ordinary skill in the art that various modifications to this invention may be made without departing from the spirit and scope of the present.

What is claimed is:

1. An expansion valve comprising:
an inlet opening adapted to receive fluid medium in a liquid state,
a distributor comprising an inlet part fluidly connected to the inlet opening, the distributor being arranged to distribute fluid medium received from the inlet opening to at least two parallel flow paths,
at least two outlet openings, each being adapted to deliver fluid medium in an at least partly gaseous state, each of the at least two outlet openings being fluidly connected to one of the at least two parallel flow paths, and
a first valve part and a second valve part arranged movably relative to each other in such a manner that the mutual position of the first valve part and the second valve part determines an opening degree of the expansion valve,
wherein the first valve part comprises a first disk having a first set of openings formed therein, and the second valve part comprises a second disk having at least two openings defined therein,
wherein a bottom face of the first disk contacts a top face of the second disk, and
wherein each of the at least two openings of the second disk are individually and directly connected to one of the at least two outlet openings.

2. The expansion valve according to claim 1, wherein the distributor is arranged in such a manner that at least substantially liquid fluid medium is distributed to each of the at least two parallel flow paths.

3. The expansion valve according to claim 1, wherein the first valve part and/or the second valve part form(s) part of the distributor.

4. The expansion valve according to claim 1, wherein the distributor is fluidly connected between the inlet opening and the first and second valve parts.

5. The expansion valve according to claim 1, wherein the fluid medium is a refrigerant.

6. The expansion valve according to claim 1, wherein a correspondence between opening degree of the expansion valve and mutual position of the first valve part and the second valve part is defined by a geometry of the first valve part and/or a geometry of the second valve part.

7. The expansion valve according to claim 1, wherein the first valve part and/or the second valve part is/are movable to obtain a mutual position of the first valve part and the second valve part in which fluid flow to at least one of the at least two parallel flow paths is prevented.

8. The expansion valve according to claim 1, wherein the first set of openings and the at least two openings of the second disk are arranged in such a manner that openings of the first set of openings and the at least two openings of the second disk can be arranged at least partly overlappingly in response to a mutual rotational movement of the first disk and the second disk, the at least two openings each being fluidly connected to one of the at least two outlet openings, the mutual angular position of the disks defining opening degrees of the expansion valve towards the outlet openings.

9. The expansion valve according to claim 8, wherein the geometry of the first set of openings and/or the geometry of the at least two openings of the second disk define(s) a correspondence between opening degree of the expansion valve towards the outlet openings and mutual angular position of the first disk and the second disk.

10. The expansion valve according to claim 8, wherein the number of openings formed in the second disk is larger than the number of openings formed in the first disk.

11. The expansion valve according to claim 8, further comprising means for biasing the first disk and the second disk in a direction away from each other.

12. The expansion valve according to claim 11, wherein the biasing means comprises means for regulating at least one pressure occurring at or near the first disk and/or the second disk.

13. The expansion valve according to claim 1, wherein the first valve part comprises a plurality of valve elements, each arranged movably relative to a valve seat, each valve element/valve seat pair being arranged to control a flow of liquid medium to an outlet opening, and wherein the second valve part comprises a cam shaft arranged to abut the valve elements in such a manner that a position of the cam shaft determines the mutual positions of the valve elements and the valve seats.

14. The expansion valve according to claim 13, wherein the cam shaft is rotatably movable relative to the valve elements.

15. The expansion valve according to claim 13, wherein the cam shaft is translationally movable relative to the valve elements.

16. The expansion valve according to claim 15, wherein movements of the cam shaft are driven by an actuator comprising a thermostatic valve.

17. The expansion valve according to claim 13, wherein the cam shaft is movable into a position in which at least one of the valve element/valve seat pairs prevents fluid flow to the corresponding flow path.

18. The expansion valve according to claim 1, further comprising an actuator arranged for driving relative movements of the first valve part and the second valve part in such a manner that fluid flow to each of the at least two outlet openings is thereby simultaneously controlled.

19. A refrigeration system comprising:
at least one compressor,
at least one condenser,
at least two evaporators arranged in parallel along a refrigerant flow path of the refrigeration system, and
a expansion valve according to any of the preceding claims, said expansion valve being arranged in such a manner that each of the at least two outlet openings is arranged to deliver refrigerant to one of the evaporators.

20. An expansion valve comprising:
an inlet opening adapted to receive fluid medium in a liquid state,
a distributor comprising an inlet part fluidly connected to the inlet opening, the distributor being arranged to distribute fluid medium received from the inlet opening to at least two parallel flow paths,
at least two outlet openings, each being adapted to deliver fluid medium in an at least partly gaseous state, each of the at least two outlet openings being fluidly connected to one of the at least two parallel flow paths, and
a first valve part and a second valve part arranged movably relative to each other in such a manner that the mutual position of the first valve part and the second valve part determines an opening degree of the expansion valve,
wherein the first valve part comprises a first disk having a first set of openings formed therein, and the second valve part comprises a second disk having a second set of openings defined therein, wherein a bottom face of the first disk contacts a top face of the second disk, wherein each of the first disk and the second disk are enclosed within a housing, and wherein each of the first disk and the second disk rotates relative to each other.

\* \* \* \* \*